United States Patent [19]

McKinney, Jr.

[11] 4,248,142
[45] Feb. 3, 1981

[54] APPARATUS FOR EXTRACTING CITRUS PEEL OIL FROM WHOLE FRUIT

[75] Inventor: James E. McKinney, Jr., Winter Haven, Fla.

[73] Assignee: Brown International Corporation, Covina, Calif.

[21] Appl. No.: 29

[22] Filed: Jan. 2, 1979

[51] Int. Cl.³ ................ A23N 1/00; B65G 47/26
[52] U.S. Cl. .................................. 99/509; 83/867; 99/536; 198/425; 198/531
[58] Field of Search .............. 99/488, 489, 495, 496, 99/509, 510; 198/425, 531; 83/867

[56] References Cited

U.S. PATENT DOCUMENTS

| | | |
|---|---|---|
| 1,734,534 | 11/1929 | Shields . |
| 2,289,851 | 7/1942 | Maxey . |
| 2,368,800 | 2/1945 | Bingenheimer . |
| 2,527,364 | 10/1950 | Koffler . |
| 2,751,059 | 6/1956 | Klein et al. ............... 198/425 |
| 2,968,385 | 1/1961 | Harkey .................... 198/531 |
| 2,978,092 | 4/1961 | Phillips et al. ............ 198/531 |
| 3,273,305 | 9/1966 | Dreeben .................. 198/531 |
| 3,506,047 | 4/1970 | Greenlaw . |
| 3,546,838 | 12/1970 | Alduk ...................... 198/425 |
| 3,707,176 | 12/1972 | Bushman ................... 99/495 |
| 3,954,032 | 5/1976 | Holbrook .................. 99/495 |
| 4,069,909 | 1/1978 | Altman et al. ............ 198/531 |
| 4,070,959 | 1/1978 | Bushman et al. .......... 99/510 |

Primary Examiner—Billy J. Wilhite
Assistant Examiner—Timothy F. Simone
Attorney, Agent, or Firm—Lyon & Lyon

[57] ABSTRACT

The method and apparatus for extracting oil from the peel of whole citrus fruit accumulates a plurality of rows of citrus fruit articles and then causes mass movement of said accumulation to displace a similar group of whole fruit articles being processed in troughs or pockets between power-driven parallel toothed rolls. The accumulation may be accomplished by means of a movable barrier gate near the lower end of an inclined chute on which the fruit articles accumulate.

5 Claims, 3 Drawing Figures

APPARATUS FOR EXTRACTING CITRUS PEEL OIL FROM WHOLE FRUIT

This invention relates to a method and apparatus for extracting oil from the peel of whole citrus fruit such as, for example, lemons, limes, oranges and grapefruit. The invention is particularly directed to a new method and apparatus of intermittently causing mass movement of an accumulated group of whole fruit articles into one end of an oil extractor machine which comprises a horizontal series of power-driven parallel toothed rolls each mounted for rotary movement in the same direction. The whole fruit rests in troughs or pockets defined between the toothed rolls, and the sharp teeth of the rolls penetrate the peel of the whole fruit to release oil contained in the peel. A body of liquid such as water submerges the rolls so that the oil is released into the water rather than into the atmosphere.

It has been found that the peel oil recovery is significantly improved when the oil extractor is fed intermittently by mass movement of a group of whole fruit articles into its intake end, rather than continous feeding of whole fruit articles into the extractor. The mass movement of the group of whole fruit moves pocket-supported fruit out of the extractor, each fruit article contacting and moving the fruit article in front of it.

Apparatus for carrying out this intermittent feed cycle may comprise an inclined chute of approximately the same width as the oil extractor device, together with a movable barrier gate which causes accumulation of whole fruit articles on the chute. Periodic movement of the barrier gate permits mass movement by gravity of the accumulated whole fruit articles into the oil extractor device, to regulate the time of action of the toothed rolls against each fruit article.

Other and more detailed objects and advantages will appear hereinafter.

In the drawings

Figure 1:
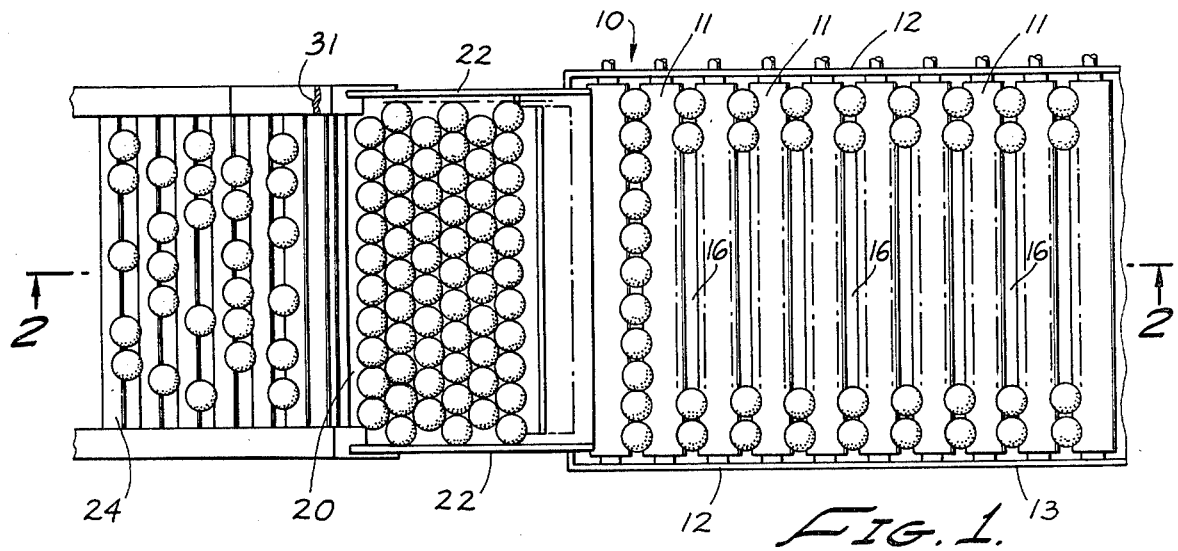
FIG. 1 is a top plan view showing a preferred embodiment of this invention in diagrammatic form.

Referring to the drawings, the citrus peel oil extractor generally designated 10 is similar to that shown in the Bushman et al U.S. Pat. No. 4,070,959 granted Jan. 31, 1978. The extractor 10 has a horizontal series of power-driven parallel toothed rolls 11 each mounted for rotary movement on the side walls 12 of a base or tank 13. These side walls 12 cooperate with a bottom wall 14, a front wall 15, and a rear wall (not shown) to contain a liquid such as water having a level L slightly above the tops of the rolls 11. Each of the rolls 11 has a series of external needle-like teeth for penetration of the peel of whole citrus fruit. The rolls 11 are power driven in the same direction, preferably by the apparatus of the type shown in said U.S. Pat. No. 4,070,959.

Whole citrus fruit articles F such as lemons, oranges, limes or grapefruit, rest in the troughs or pockets 16 between the rolls 11 so that the needle-like teeth on the rolls penetrate the peel of the whole fruit articles F. This penetration occurs below the water line L so that the citrus peel oil is discharged into the water rather than into the atmosphere. The oil is later separated from the water in a conventional manner. After the citrus fruit articles have passed through the extractor 10 in a direction left-to-right, as shown in the drawings, to remove oil from the peel, the juice may be extracted from the fruit by conventional apparatus. Pendant pusher elements 17 pivotally mounted on an endless chain 18 extend into the tank 13 and move in the same direction as the desired travel of the fruit articles F. Fruit articles which may pile up above those resting in the pockets 16 are thus urged to move along by the pendant elements 17.

In previous forms of citrus peel oil extractors of this general type, feeding of the whole fruit articles F into the oil extractor 10 took place in continuous uninterrupted fashion. The fruit articles F entering the extractor device 10 served to push the fruit articles already in the pockets 16 in a left-to-right direction from one pocket 16 to the next. However, it has been found that superior results in the form of higher yields of citrus peel oil are achieved by intermittent introduction of whole fruit articles by mass movement at timed intervals. Preferred apparatus for accomplishing this intermittent feeding cycle comprises an inclined chute 20 having its discharge end 21 projecting into the tank 13 of the extractor 10. The inclined chute 20 is approximately the same width between its side walls 22 as the width between the side walls 12 of the oil extraction device 10. Whole fruit articles F are delivered by the continuously operating roller conveyor 24 to the upper end of the inclined chute 20. A movable barrier gate 25 is pivoted at 26 on the side walls 22 of the chute 20. A power cylinder assembly 28 is pivoted at 29 to the barrier gate 25 and is pivoted at 30 to the stationary bracket 31. The power cylinder assembly 28 and its associated parts are omitted in FIG. 1 for clarity of illustration.

In operation, whole fruit articles F fill the pockets 16 between the power-driven toothed rolls 11. The rolls all turn in the same direction and the peel of the whole fruit articles is punctured by the needle-like teeth on the rolls 11, releasing peel oil into the body of water within the tank 13. Any whole fruit articles F which ride on top of other fruit in the pockets 16 are moved forward by the continuously operating conveyor 18 with its pendant devices 17.

Figure 2:
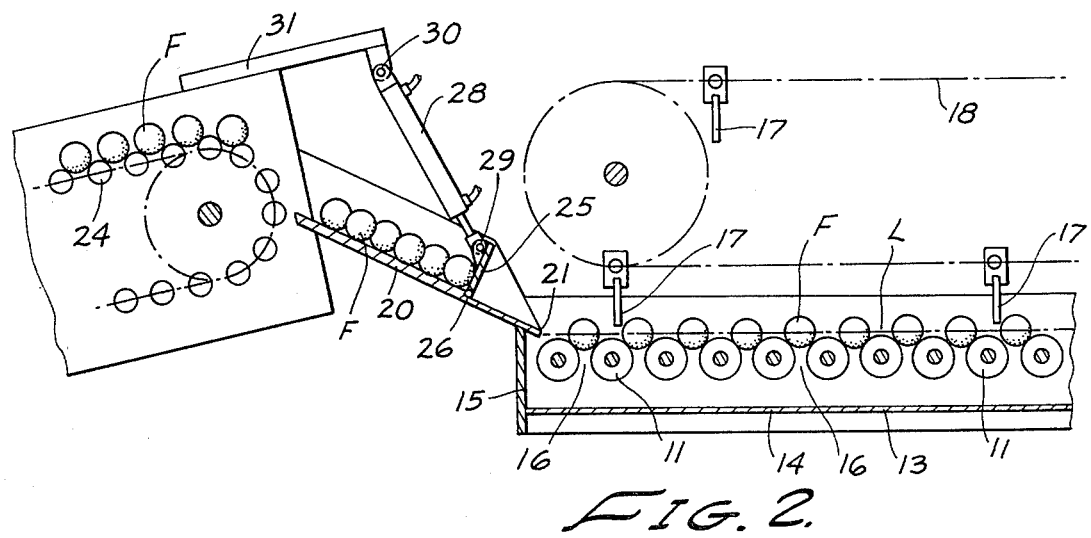
FIG. 2 is a sectional side elevation taken substantially on the lines 2—2 as shown in FIG. 1.
Figure 3:
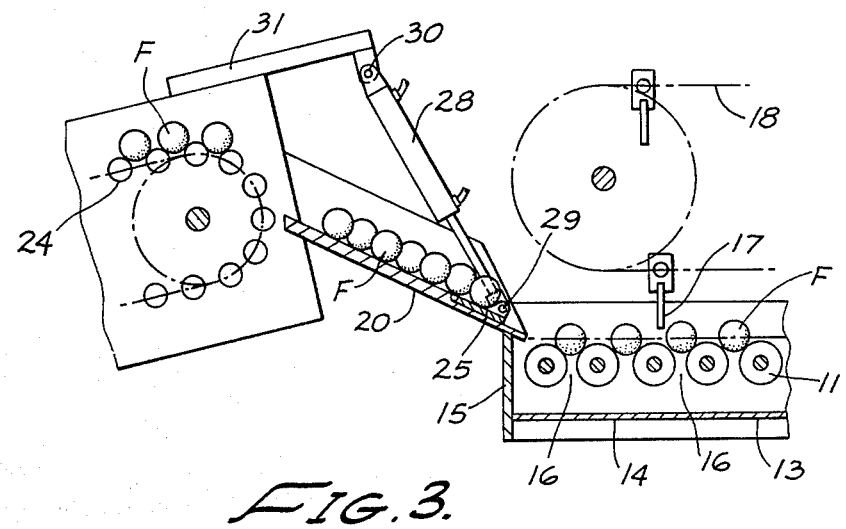
FIG. 3 is view similar to FIG. 2 showing the feed mechanism in a different position.

After a predetermined time interval the power cylinder assembly 28 is extended from the first position shown in FIG. 2 to the second position shown in FIG. 3. In the first position, whole fruit articles F are accumulated on the inclined chute 20, and when the barrier gate 25 is moved to its second position the accumulated whole fruit articles on the chute 20 descend by gravity in a mass movement along the full width of the chute 20 and displace an approximately equal number of whole fruit articles F which have been in contact with the toothed rolls 11. The displaced whole fruit articles F are thus moved toward the discharge end (not shown) of the oil extractor 10. The fruit articles which are displaced out of the oil extractor 10 are subsequently treated to remove the juice from the interior thereof.

The power cylinder assembly 28 may be placed on an automatic time cycle so that mass discharge of accumulated fruit occurs at regular intervals.

In a particular apparatus embodying this invention, the barrier gate 25 is closed for about 2 seconds and then opens for 4 seconds. This allows the whole fruit articles F to stop and settle down in the pockets 16 approximately four times in the length of the tank 13 of the oil extractor 10. Actual tests on that particular apparatus shows that the use of the barrier gate 25 produces about more peel oil than the same apparatus without the barrier gate.

Having fully described my invention, it is to be understood that I am not to be limited to the details herein set forth but that my invention is of the full scope of the appended claims.

I claim:

1. For use with a continuously operating conveyor, a citrus oil extractor having a horizontal series of power-driven parallel rotary toothed rolls defining pockets between them for reception of whole citrus fruit articles and penetration of the peel thereof, said series of rotary rolls extending from an entrance end to a discharge end of the oil extractor, a device operatively interposed between the conveyor and the oil extractor for delivering accumulated groups of whole citrus fruit articles into the entrance end of said oil extractor, means including a member movable between a first position causing accumulation of whole citrus fruit articles on the device to a second position causing mass movement of said accumulated group into the entrance end of the oil extractor, the mass movement of said accumulated group acting to sequentially transfer whole citrus fruit articles in the pockets toward the discharge end of the oil extractor, each citrus fruit article contacting and moving the fruit article in front of it, whereby the time of action of the toothed rolls against each whole citrus fruit article is regulated.

2. The combination set forth in claim 1 in which said device comprises a feed chute.

3. The combination set forth in claim 2 in which the extractor and said device each have side walls spaced substantially the same distance apart.

4. For use with a continuously operating conveyor, a citrus oil extractor having a horizontal series of power-driven parallel rotary toothed rolls defining pockets between them for reception of whole citrus fruit articles and penetration of the peel thereof, said series of rotary rolls extending from an entrance end to a discharge end of the oil extractor, an inclined feed chute operatively interposed between the conveyor and the oil extractor for delivering accumulated groups of whole citrus fruit articles into the entrance end of said oil extractor, means including a barrier gate movable between a first position causing accumulation of whole citrus fruit articles on the feed chute to a second position causing mass movement of said accumulated group by gravity into the entrance end of the oil extractor, the mass movement of said accumulated group acting to sequentially transfer whole citrus fruit articles in the pockets toward the discharge end of the oil extractor, each citrus fruit article contacting and moving the fruit article in front of it, whereby the time of action of the toothed rolls against each whole citrus fruit article is regulated.

5. The combination set forth in claim 4 in which the extractor and said device each have side walls spaced substantially the same distance apart.

* * * * *